(12) United States Patent
Smith et al.

(10) Patent No.: US 11,732,371 B2
(45) Date of Patent: Aug. 22, 2023

(54) METHOD AND APPARATUS FOR CONTROLLING AN ELECTROCHEMICAL PROCESS

(71) Applicants: NewSouth Innovations Pty Limited, Sydney (AU); The University of Queensland, Brisbane (AU)

(72) Inventors: Sean Campbell Smith, Maroubra (AU); Xin Tan, Hurstville (AU); Hassan Tahini, Bexley (AU); Zhonghua Zhu, Indooroopilly (AU); Xiaoyong Xu, Taringa (AU)

(73) Assignees: NewSouth Innovations Pty Limited, Sydney (AU); The University of Queensland, Brisbane (AU)

( * ) Notice: Subject to any disclaimer, the term of this patent is extended or adjusted under 35 U.S.C. 154(b) by 172 days.

(21) Appl. No.: 16/340,270

(22) PCT Filed: Oct. 12, 2017

(86) PCT No.: PCT/AU2017/051106
§ 371 (c)(1),
(2) Date: Apr. 8, 2019

(87) PCT Pub. No.: WO2018/068094
PCT Pub. Date: Apr. 19, 2018

(65) Prior Publication Data
US 2020/0299849 A1    Sep. 24, 2020

(30) Foreign Application Priority Data
Oct. 12, 2016  (AU) .............................. 2016904139

(51) Int. Cl.
*C25B 15/02* (2021.01)
*C25B 1/04* (2021.01)

(52) U.S. Cl.
CPC ............... *C25B 15/02* (2013.01); *C25B 1/04* (2013.01)

(58) Field of Classification Search
CPC .. C25B 11/00; C25B 1/02; C25B 1/04; C25B 15/02; H01M 8/04238; H01M 8/04895;
(Continued)

(56) References Cited

U.S. PATENT DOCUMENTS 4,414,080 A * 11/1983 Williams .................. C25B 1/55
204/278
6,689,269 B1 * 2/2004 Schuster .................. B23H 3/02
204/224 M (Continued)

FOREIGN PATENT DOCUMENTS

CN    1450207 A  * 10/2003
CN    200981895    11/2007
(Continued)

OTHER PUBLICATIONS

L. Jörissen, H. Frey; "ENERGY | Energy Storage"; Encyclopedia of Electrochemical Power Sources, 2009, pp. 215-231 (Year: 2009).*
(Continued)

*Primary Examiner* — Alexander W Keeling
*Assistant Examiner* — Mofoluwaso S Jebutu
(74) *Attorney, Agent, or Firm* — Klarquist Sparkman, LLP

(57) ABSTRACT

The present disclosure provides a method and apparatus to perform an electrochemical process by manipulating the charge on an electrode involved in the primary circuit of the electrochemical reaction. The amount of charge on the electrode can be manipulated independent of the bias voltage of the primary circuit and is accomplished by coupling the electrode with various different configurations.

8 Claims, 19 Drawing Sheets

(58) Field of Classification Search
CPC ......... H01M 8/04902; H01M 8/04949; H01M 8/04951
See application file for complete search history.

(56) References Cited

U.S. PATENT DOCUMENTS

| | | | |
|---|---|---|---|
| 2008/0116080 A1* | 5/2008 | Lal | C25B 1/55 205/334 |
| 2008/0296171 A1* | 12/2008 | Davidson | C25B 15/00 204/229.4 |
| 2008/0296173 A1* | 12/2008 | Mishra | C25B 1/02 205/742 |
| 2015/0196888 A1 | 7/2015 | Liu et al. | |
| 2015/0263371 A1 | 9/2015 | Stahl et al. | |
| 2016/0083856 A1* | 3/2016 | Iwatsu | C25D 17/10 205/477 |
| 2016/0167984 A1 | 6/2016 | Gao et al. | |

FOREIGN PATENT DOCUMENTS

| | | | | |
|---|---|---|---|---|
| CN | 105229205 | | 1/2016 | |
| GB | 2295829 | | 6/1996 | |
| JP | 2007100187 A | * | 4/2007 | |
| JP | 2013-049888 A | | 3/2013 | |
| JP | 2013049888 A | * | 3/2013 | C25B 1/04 |
| JP | 2015-004124 A | | 1/2015 | |
| WO | WO208147399 | | 12/2008 | |

OTHER PUBLICATIONS

The Editors of Encyclopaedia Britannica, "Fermi level". Encyclopedia Britannica, Oct. 6, 2006, https://www.britannica.com/science/Fermi-level. (Year: 2006).*
Parmar, Jigu, Earthing in electrical network—purpose, methods and measurement, 2011, Electrical Engineering Portal, https://electrical-engineering-portal.com/earthing-in-electrical-network-purpose-methods-and-measurement (Year: 2011).*
Office Action for Chinese Patent Application No. 201780062006.3, dated Oct. 14, 2020 (w/English translation).
Office Action for Indian Patent Application No. 201917017466, dated Oct. 22, 2020.
Office Action for Singaporean Patent Application No. 11201903053R, dated Sep. 15, 2020.
International Search Report and Written Opinion for PCT/AU2017/051106, dated Nov. 13, 2017.
Extended Search Report for European Application No. 17859509.6, dated May 8, 2020.
Second Office Action, dated Jun. 15, 2021, issued in counterpart China Patent Application No. 201780062006.3, 5 pages.
Office Action, dated Jul. 27, 2021, issued in counterpart Japan Patent Application No. 2019-519315, 7 pages.

* cited by examiner

A volcano plot emerges when using $\Delta G_O - \Delta G_{OH}$ (or the charge density) as a descriptor. The lowest overpotential occurs when charging with 1 e and corresponds to ~0.68 V which is 40% improvement from the neutral case.

METHOD AND APPARATUS FOR CONTROLLING AN ELECTROCHEMICAL PROCESS

CROSS REFERENCE TO RELATED APPLICATIONS

This is the U.S. National Stage of International Application No. PCT/AU2017/051106, filed Oct. 12, 2017, which was published in English under PCT Article 21(2), which in turn claims the benefit of Australian Patent Application No. 2016904139, filed Oct. 12, 2016, which is incorporated herein in its entirety.

FIELD OF THE INVENTION

The present invention relates to a method and apparatus for controlling an electrochemical process and particularly, but not exclusively, to a method and apparatus for controlling an electrocatalytic reaction.

BACKGROUND OF THE INVENTION

Electrochemical and electrocatalytic reactions are widely used for applications such as Hydrogen Evolution Reaction (HER), formation of oxygen from water (Oxygen Evolution Reaction, OER), reduction of oxygen to water (Oxygen Reduction Reaction, ORR) and many other Redox reactions. They are applied on an industrial scale. The typical arrangement for implementing an electrochemical process comprises a source of current/voltage, a pair of electrodes and an electrolyte. The electrodes may comprise a charged Working Electrode (WE) and a Counter Electrode (CE). In electrocatalytic reactions, the Working Electrode may be of a material which facilitates (catalyses) the electrochemical reaction.

In order to improve the efficiency and effectiveness of electrochemistry and electrochemical reactions, it is known to vary the types of electrode materials used, the electrolytes and the voltages applied in the circuit. Much work has been undertaken on the design of various materials that form the Working Electrode for electrocatalysis, for example. Many of these materials are expensive and difficult to work with.

SUMMARY OF THE INVENTION

In accordance with a first aspect, the present invention provides a method of performing an electrochemical process which utilises at least one electrode and comprises the steps of:
  applying a voltage to the electrode to implement an electrochemical reaction, and
  controlling a charge on the electrode to affect the electrochemical reaction.

In an embodiment, the electrode is a working electrode in the electrochemical process. It is known that in conventional processes a layer of charge may form on the working electrode. This is usually considered an impairment to the efficiency of the electrochemical process. Where the working electrode is a catalyst, for example, the charge may deleteriously affect the binding energy of a reaction occurring at the electrode.

The applicants have found that, in an embodiment, separate control of the charge can advantageously and positively affect the chemical reaction. For example, control of the amount of charge on the electrode, may be carried out to reduce an over-potential required for the electrocatalytic reaction, and therefore improve the efficiency of the reaction.

The ability to control the level of charge on the working electrode provides a further control tool for electrochemical processes, which previously hasn't existed. In an embodiment, this may enable improvements in efficiency in electrochemical reactions, the use of cheap and readily available synthesised materials for the working electrode, and other advantages.

In electrocatalysis, embodiments of this invention may enable an entirely new level of control of electrocatalytic activity that has not previously been explored.

In an embodiment, the step of controlling the charge on the electrode comprises the step of applying an electric field to the electrode. In an embodiment, the electric field may be applied via a further electrode positioned proximate to the electrode. The further electrode may be a gate electrode, to which a voltage is applied to regulate the charge on the electrode.

In an embodiment, the electric field may be applied by a capacitor arrangement positioned proximate the electrode. The capacitor arrangement may comprise a further electrode and the electrode positioned relative to each other to form a capacitor. That is, the working electrode is integrated in the capacitor arrangement. In an alternative embodiment, a pair of electrodes forming a capacitor may be positioned proximate the working electrode.

In accordance with a second aspect, the present invention provides an apparatus for implementing an electrochemical process, comprising an electrode, a primary circuit arranged to apply a voltage to the electrode to implement an electrochemical reaction, and a control arrangement for controlling a charge on the electrode to affect the electrochemical reaction.

BRIEF DESCRIPTION OF THE DRAWINGS

Features and advantages of the present invention will become apparent from the following description of embodiments thereof, by way of example only, with reference to the accompanying drawings, in which.

Figure 11:
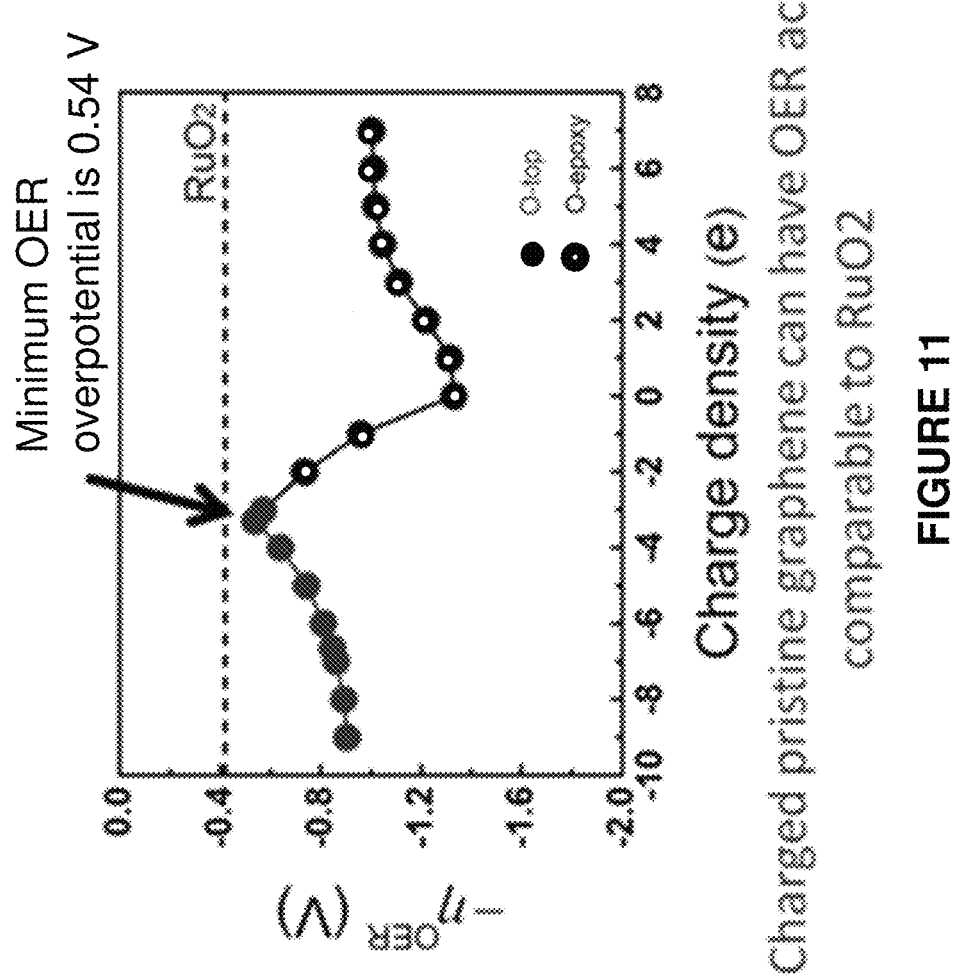
Figure 13:
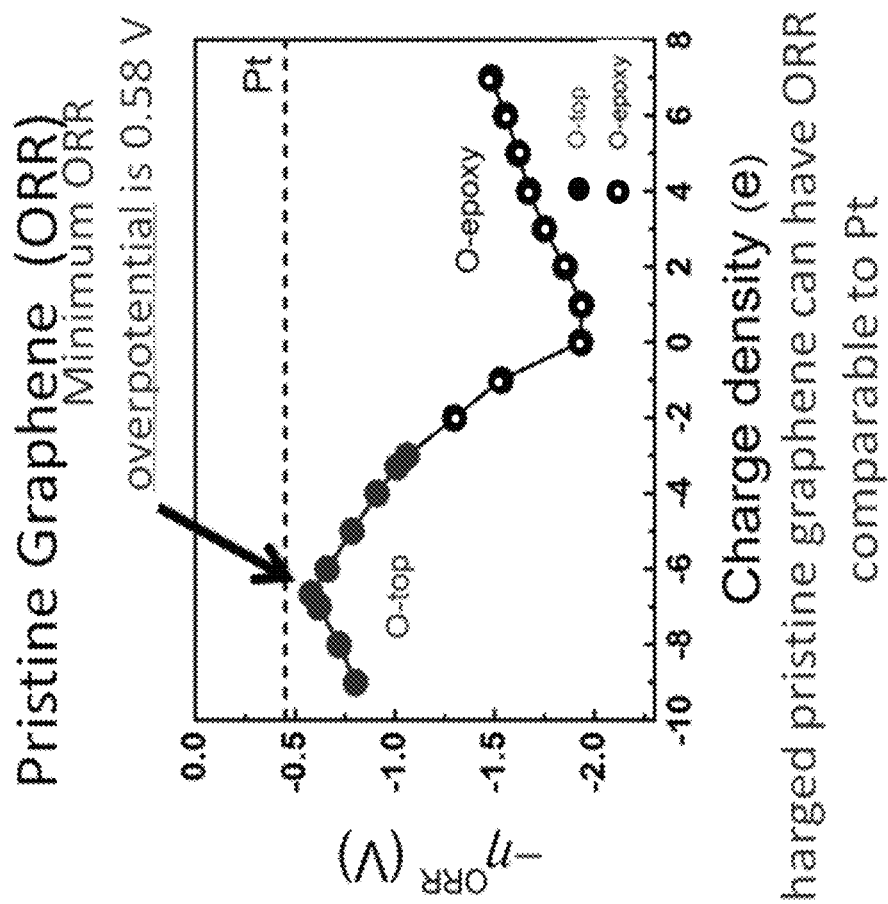
Figure 14:
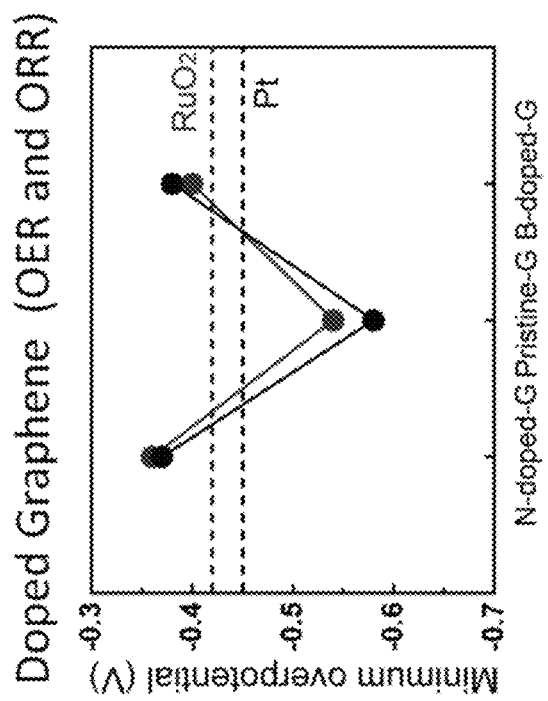
Figure 15:
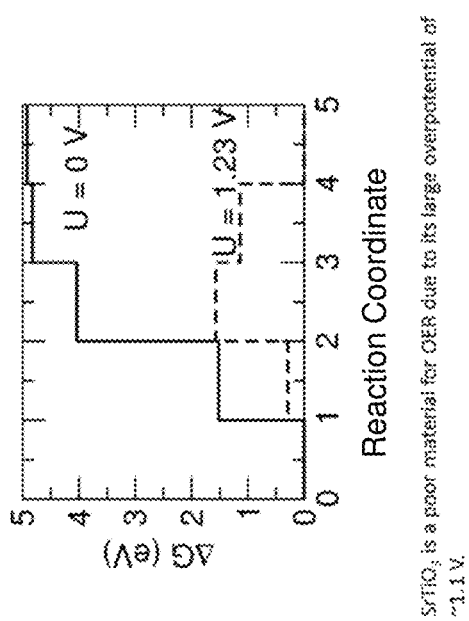
Figure 16:
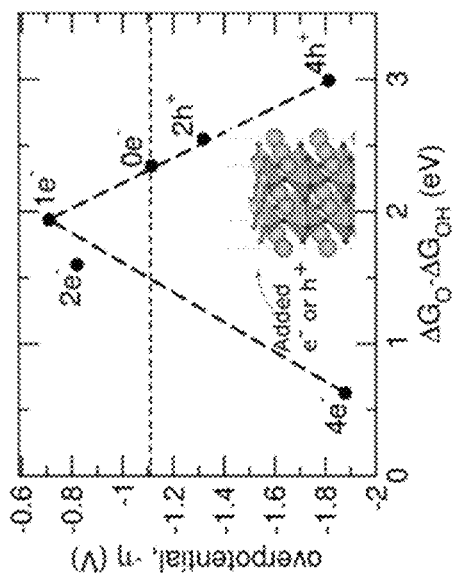

different charge is applied to the working electrode to obtain the results, when charge=−3.3 e, overpotential=0.54 V;

FIG. 11 shows that a charged pristine graphene can have OER activity comparable to $RuO_2^-$;

FIG. 12 shows computational results for ORR process with pristine graphene as the working electrode, (a) no charge is applied to pristine electrode and overpotential=1.93 V, and (b) different charge applied to pristine electrode to obtain and compare results, when charge=−6.65 e then overpotential is 0.58;

FIG. 13 shows that a charged pristine graphene can have ORR activity comparable to Pt electrode;

FIG. 14 shows that charged N- and B-doped graphene can have better OER and ORR activity that Pt and $RuO_2$, In this figure, the minimum overpotential is −η;

FIG. 15 shows that $SrTiO_3$ is a poor material for OER due to its large overpotential of ~1.1V;

FIG. 16 illustrates a volcano plot that emerges when using $\Delta G_O$-$\Delta G_{OH}$ (or charge density) as a descriptor. The lowest overpotential occurs when charging with 1 e and corresponds to ~0.68 V which is 40% improvement from the neutral case.

Figure 17:
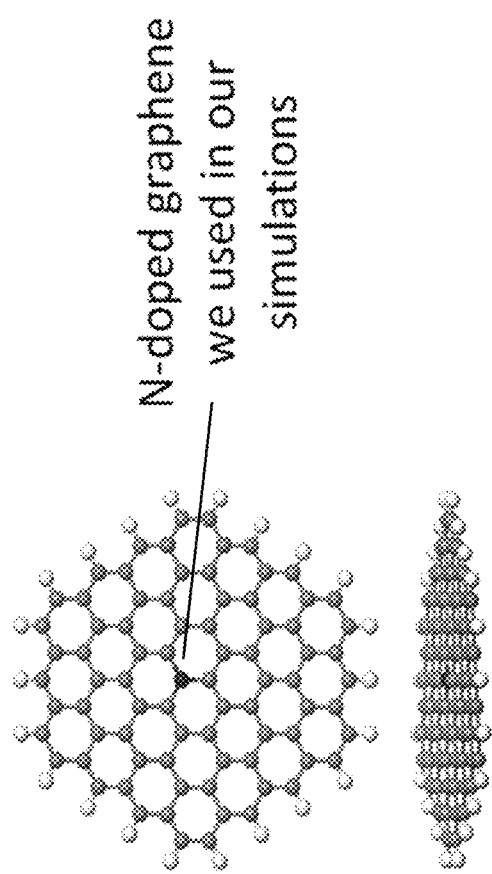
Figure 18:
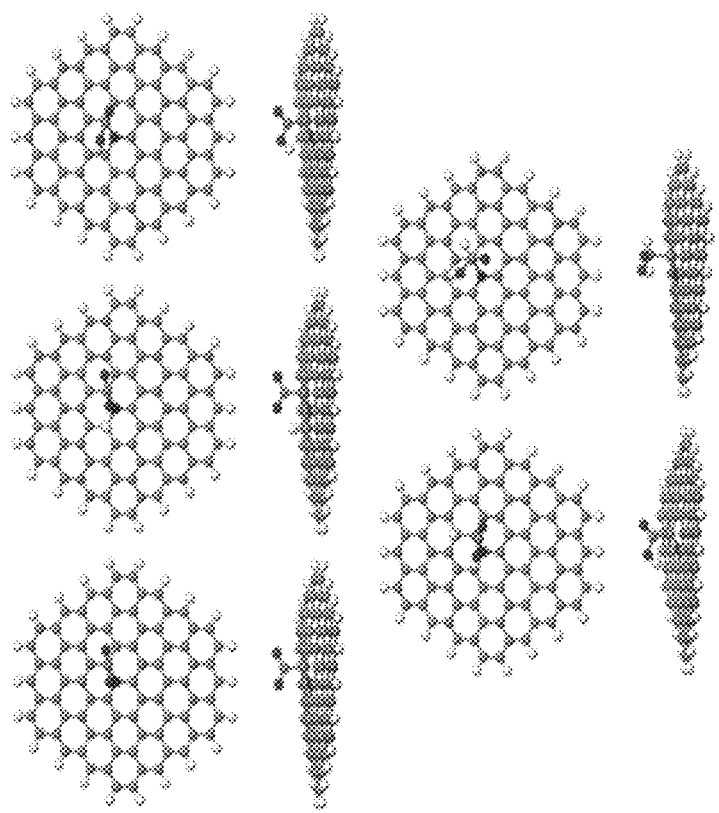
Figure 19:
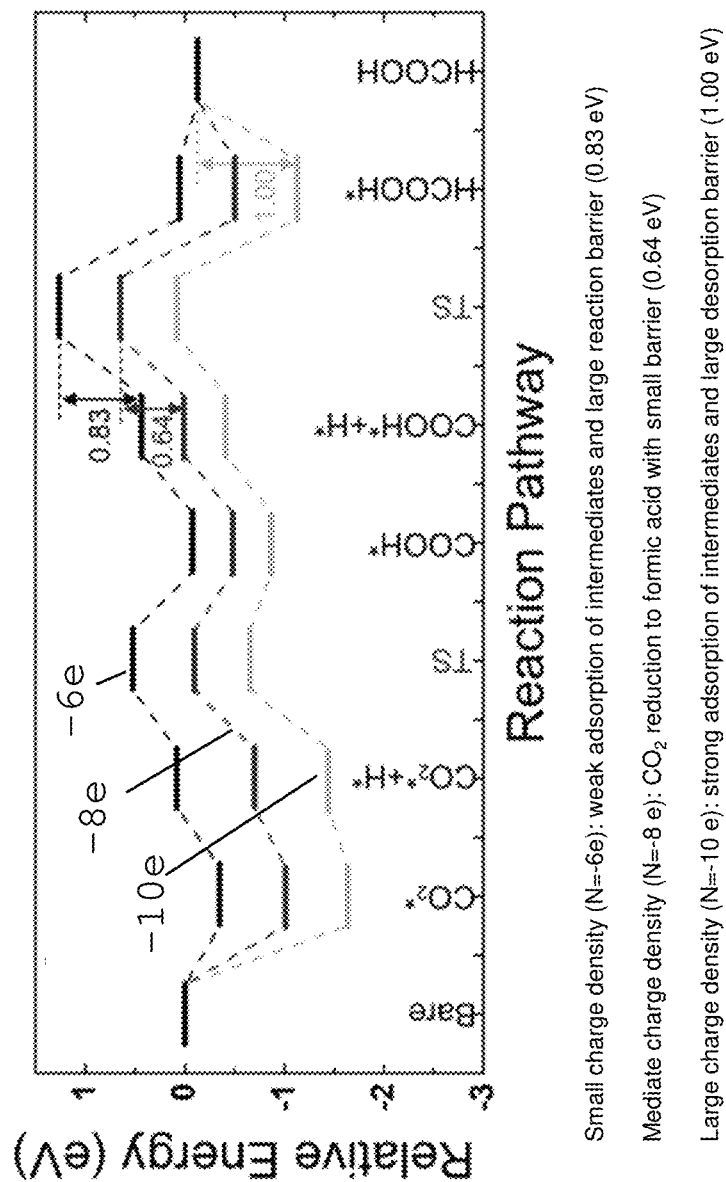

FIG. 17 illustrates a structure of N-doped graphene used in simulations and other examples of implementation of embodiments;

FIG. 18 illustrates intermediate structures of N-doped graphene for various elementary reduction steps for $CO_2$ reduction processes, and FIG. 19 illustrates variation in free energies of the elementary reactions involved in a $CO_2$ reduction processes for different extents of charge on N-doped graphene electrode.

DETAILED DESCRIPTION OF EMBODIMENTS

Figure 1:
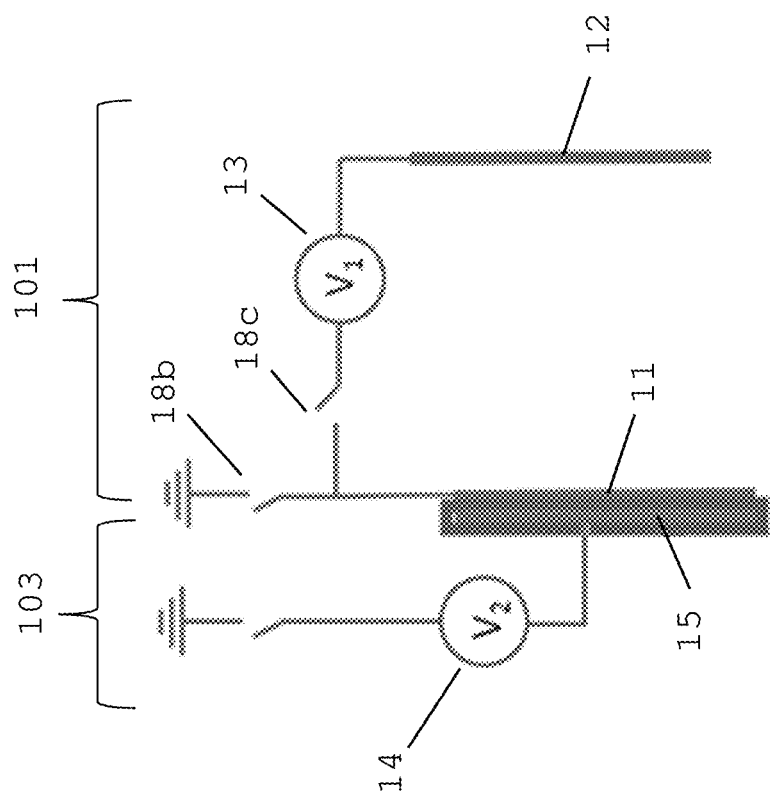
FIG. 1 is a diagram of an apparatus for control of an electric charge on an electrode for an electrochemical process, in accordance with an embodiment.

FIG. 1 shows an apparatus for performing and controlling an electrochemical process. A primary voltage circuit arrangement 101 is used to apply a voltage V1 between a working electrode 11 and a counter electrode 12 to implement an electrochemical process. A control arrangement 103 is used for controlling an electric charge on the working electrode 11 to affect the performance of the electrochemical process.

In this embodiment, the primary voltage circuit arrangement 101 consists of a primary voltage source 13 which is arranged to provide a potential difference $V_1$ between the working electrode 11 and a counter electrode 12. The working electrode 11 can be made of any material, e.g. carbon or graphene, which is suitable for the particular electrochemical process. In a particular embodiment, the control arrangement 103 is a voltage gate system in which the working electrode 11 is coupled to a gate electrode 15. This coupling is achieved by placing the gate electrode 15 in close proximity to the working electrode 11. A gate voltage source 14 is connected to the gate electrode 15. Applying a voltage $V_2$ to the gate electrode 15 produces an electric field that shifts the intrinsic Fermi level of the working electrode 11 downward (or upward depending on the V2 applied) relative to earth potential, allowing electrons to flow into (or out of) the working electrode 11 to produce a net negative (or positive) charge on the working electrode 11. Disconnecting the earth connection (by opening switch 18b) and connecting the primary voltage source 13 (by closing switch 18c) allows the charged working electrode to operate at a primary voltage $V_1$ whilst at the same time possessing the net electric charge on it.

In conventional electrochemistry, only a primary voltage source is used to provide a potential difference between the electrodes for carrying out an electrochemical process. Various factors can be responsible for slowing down the rate of the electrochemical process, such as different activation barriers, electrode surface hindrance, resistances, and unwanted chemical reactions taking place at the electrodes etc. One problem is that a layer of charge on the working electrode may lead to an increased binding energy at the surface of the electrode. An oxidation or reduction half reaction occurring at the surface of an electrode requires additional energy to overcome the increased binding energy. Therefore, a greater applied potential difference between the electrodes is required. This additional potential required to overcome the increased binding energy at the surface of an electrode is known as over-potential. It is known to tune the primary voltage source for providing a higher potential (standard potential plus over-potential) to the electrodes. However, this leads to high energy consumption without any significant improvement in the efficiency and performance of the electrochemical process.

The present applicants have found that the performance of an electrochemical process in a conventional circuit can be improved in an embodiment, by introducing the control arrangement 103 for manipulating the amount of electric charge on the electrode surface 11 as shown in FIG. 1. The manipulation of the electric charge on the electrode 11 is independent of the primary voltage $V_1$ applied to the electrodes. This creates an entirely new tool for affecting electrochemistry and electrocatalysis.

The control arrangement 103 allows a net electric charge (positive or negative) to be maintained on the electrode 11 while it is being operated at any primary voltage $V_1$ as dictated by the primary voltage source 13. In an embodiment, the manipulation of charge on the electrode 11 affects the binding energy and the over-potential required to carry out an oxidation/reduction half reaction near the electrode 11. The applicants believe that a suitable modulation of the electric charge of the electrode 11 can provide a reduction in the binding energy or over-potential which in turn leads to an improvement in the efficiency of the electrochemical process.

Figure 4:
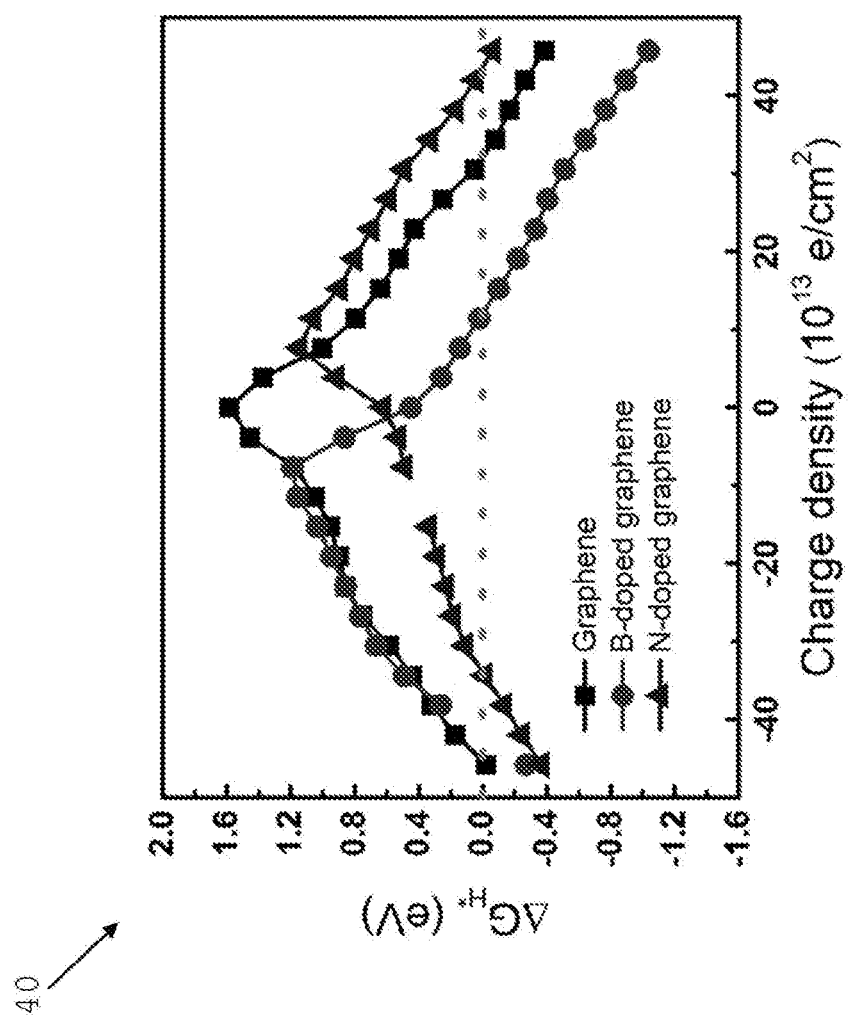
FIG. 4 is a plot illustrating the dependence of intermediate binding energy for a Hydrogen Evolution Reaction (HER) on the electric charge density for three different conductive graphene related electrode materials.

FIG. 4 illustrates the dependence of binding energies on the amount of electric charge placed on an electrode using a control arrangement for a Hydrogen Evolution Reaction (HER). The graph 40 shows plots of calculated intermediate binding energy (H-atom bound to the catalyst material) for three conductive graphene related materials namely; graphene (square shaped data points), B-doped graphene (circular data points), and N-doped graphene (triangular data points). The dashed line shows the "holy grail" condition, i.e., driving the HER at zero over-potential. These results suggest that, by manipulating the electric charge on the working electrode independently of the primary voltage, it should be possible for any of these three materials to function as an excellent HER electrocatalyst.

Figure 2:
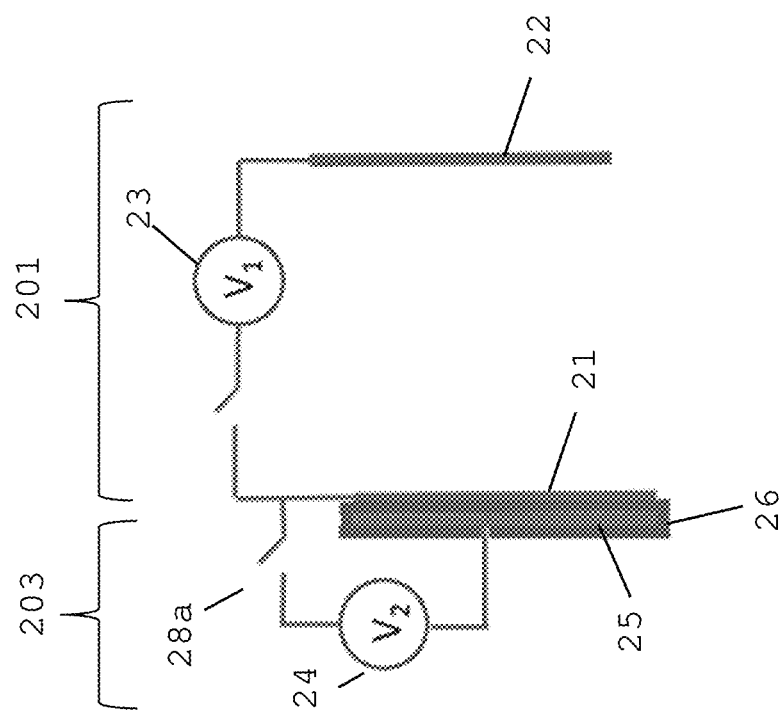
FIG. 2 is a diagram of an apparatus for modulation of an electric charge on an electrode for an electrochemical process, in accordance with a further embodiment.

A further embodiment is shown in FIG. 2. This figure illustrates an apparatus for performing an electrochemical process where a control arrangement 203 is used for controlling the modulation of an electric charge on a working electrode 21, by integrating it within a capacitor arrangement. The capacitor arrangement consists of a counter-charged electrode 25 placed in the vicinity of the working electrode 21, and a capacitor voltage source 24. A primary voltage circuit arrangement 201 is employed for providing a primary voltage V1 between the working electrode 21 and a counter electrode 22. Switch 28a is arranged in a closed position in order to apply a voltage $V_2$. Applying voltage $V_2$ produces an electric field that facilitates electrons to flow into (out of) the working electrode from the counter-charged capacitor electrode 25 (far left) to produce a net negative (or positive) charge on the working electrode 31. Disconnecting capacitor voltage source 24 and connecting the primary voltage source 23 then allows the charged working electrode 21 to operate at a primary voltage $V_1$ whilst at the same time independently possessing a net electric charge.

Figure 3:
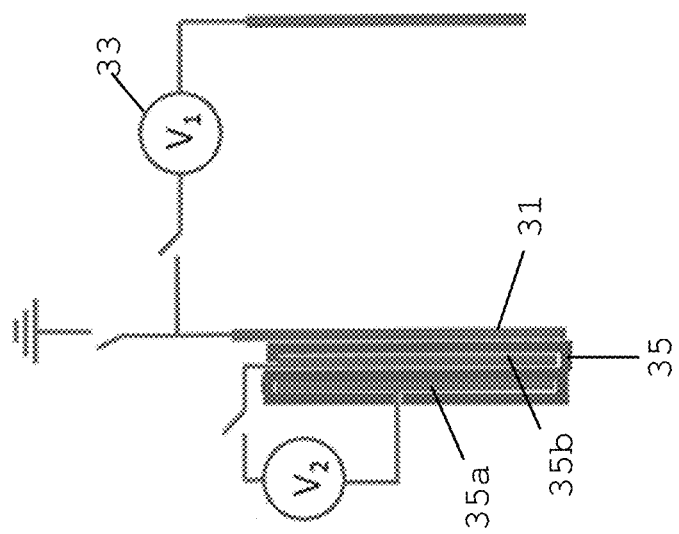
FIG. 3 is diagram of an apparatus for control of an electric charge on an electrode for an electrochemical process, in accordance with a further embodiment.

A further embodiment of the present invention is illustrated in FIG. 3. In this apparatus the modulation of a net electric charge on a working electrode 31 is employed by coupling it with an independent capacitor 35. Applying a voltage $V_2$ to the capacitor 35 produces an electric field that facilitates charge separation on the capacitor plates 35a and 35b. This, in turn, induces localization of charge on the working electrode 31. If capacitor plate 35a has a negative (positive) charge then capacitor plate 35b will carry a positive (negative) charge on it. This will facilitate an equal amount of negative (positive) charge on the working electrode 31. Connecting the primary voltage source 33 then allows the charged working electrode 31 to operate at a controlled primary voltage $V_1$ whilst at the same time possessing a net electrical charge.

EXAMPLES

Figure 5:
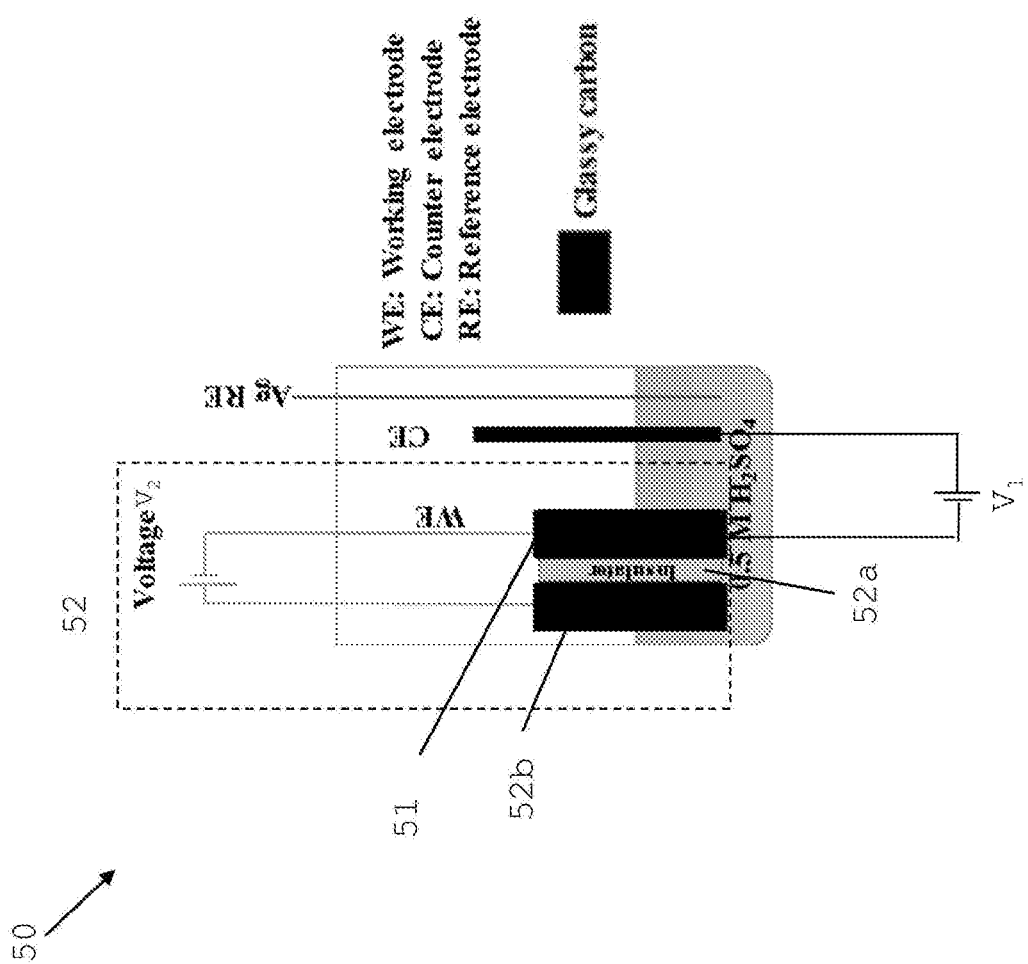
FIG. 5, is an illustration of an example apparatus for implementing a Hydrogen Evolution Reaction, in accordance with embodiment.

Referring now to FIG. 5, there is shown an example of an apparatus for a Hydrogen Evolution Reaction (HER) in accordance with the configuration shown in FIG. 2 but with the insulation 26 only between the capacitor plates. In this apparatus 50, a control arrangement 52 is arranged to control the net electric charge on a working electrode (WE) 51 which is made of glassy carbon material. The working electrode 51 is coupled to another electrode (also made of glassy carbon) 52b to form an integrated capacitor. The two electrodes forming the capacitor are separated by an insulating material 52a. The capacitor is first charged by applying a capacitor voltage $V_2$ between the electrodes to modulate charge on the working electrode 51. The voltage source $V_2$ is then switched off and the primary circuit voltage $V_1$ is applied the working electrode 51 (WE) and counter electrode (CE) to begin the HER experiment. The apparatus also includes a reference electrode (RE) comprising Ag.

Figure 6A:
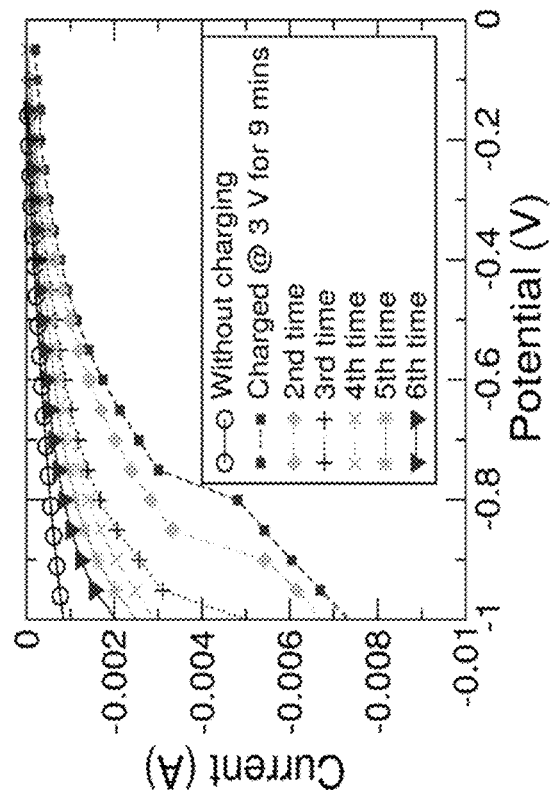
FIGS. 6, 7 and 8 show various plots indicating the performance of a Hydrogen Evolution Reaction implemented using the apparatus of FIG. 5.
Figure 6B:
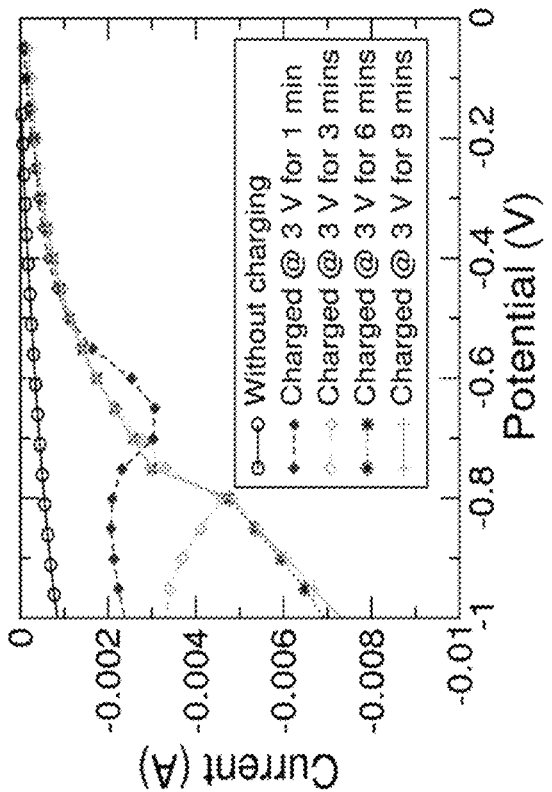

FIG. 6 shows example LSV polarization plots obtained by using apparatus 50. In FIG. 6a, the capacitor, formed of glassy carbon electrodes 51 and 52b, is charged at a voltage $V_2$=3V for varying lengths of time before commencing the HER reaction. The accumulated charge on the electrode 51 can dissipate over time. It is apparent that for the curves corresponding to shorter pre-charging times, the LSV curve start to revert back towards the trend for the uncharged electrode later in the scan (i.e., at more –ve voltages). FIG. 6b shows this behaviour in a different way, where the electrode is first charged at 3V for 9 minutes and then the LSV scans are repeated, one after the other, six times. The later scans show a progressive reversion towards the profile for the uncharged case, indicating progressive discharge over time.

Figures 7A, 7B:
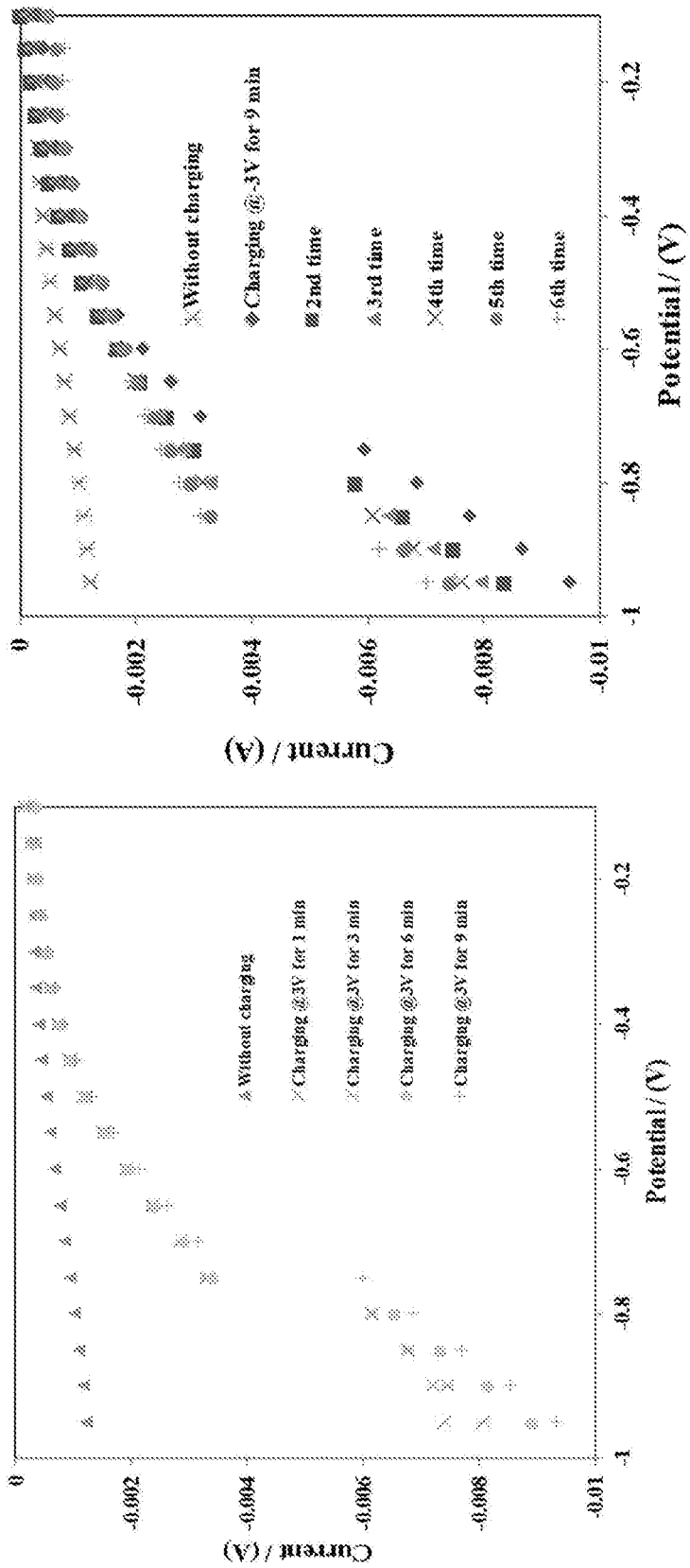

FIGS. 7a&b shows analogous plots to FIG. 6, but now where the glassy carbon electrodes have been deposited with graphene prior to running the experiment. Hence, in FIG. 7 graphene is now the active surface layer instead of glassy carbon. Qualitatively similar behaviour is observed, however. The graphene deposited electrodes exhibit a slower rate of discharge.

Figure 8B:
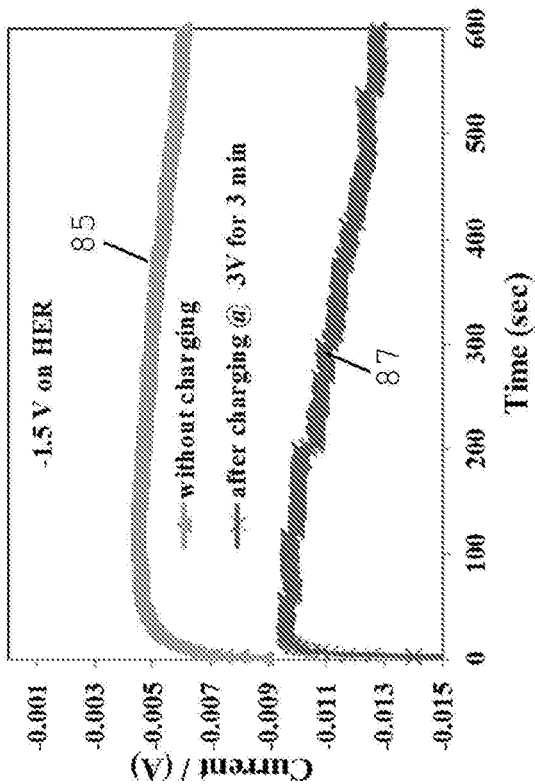
Figure 8A:
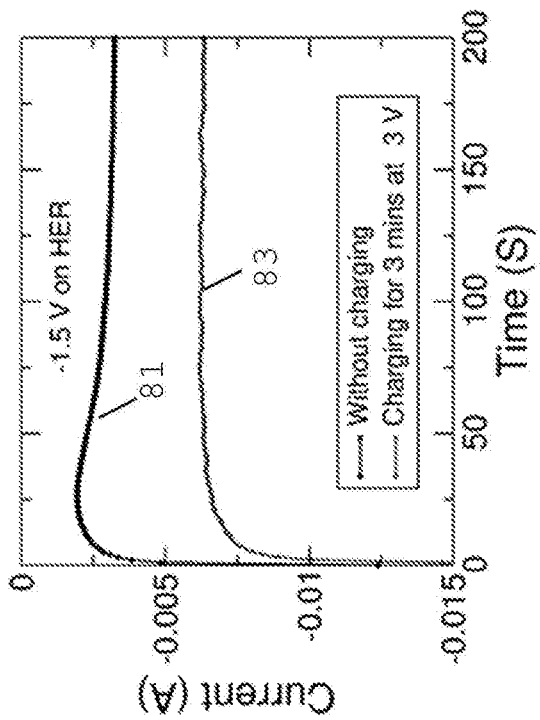

FIGS. 8a&b show the HER current when the pre-charged electrode (glassy carbon FIG. 8a and graphene-deposited glassy carbon FIG. 8b) is connected to the primary circuit at a voltage of –1.5V, indicating that at this voltage the charge is maintained persistently on the electrode and the HER proceeds at an enhanced rate—relative to the uncharged case—for longer periods.

In addition to HER, there are a range of other examples of electrocatalysis processes, in particular Oxygen Evolution Reaction (OER), Oxygen Reduction Reaction (ORR), and $CO_2$ reduction process, for which predictive first-principle modelling indicates that a significant enhancement in their performance and efficiency can be achieved when the working electrodes undergoe an appropriate charge modulation.

Figure 9C:
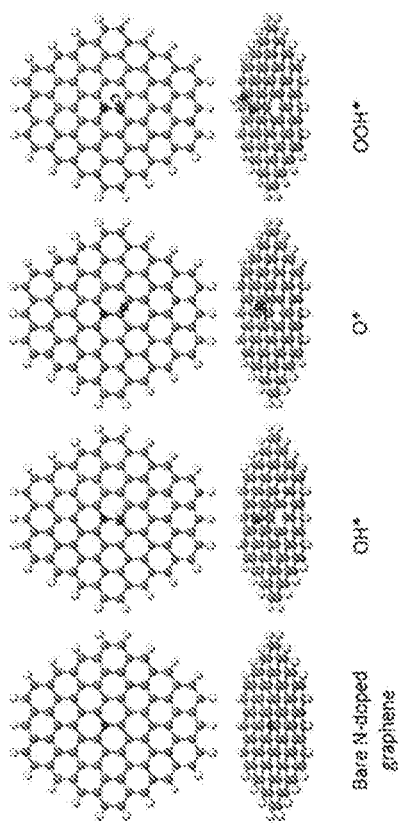
FIG. 9 illustrates various reaction and intermediate structures with graphene or doped graphene used as the working electrode.
Figure 9A:
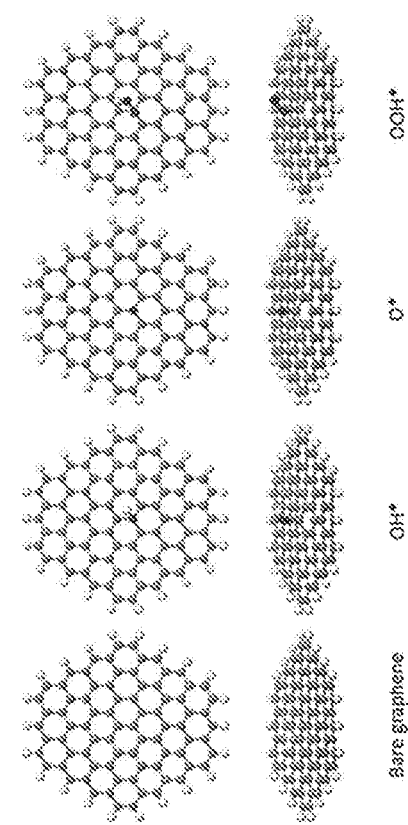
Figure 9B:
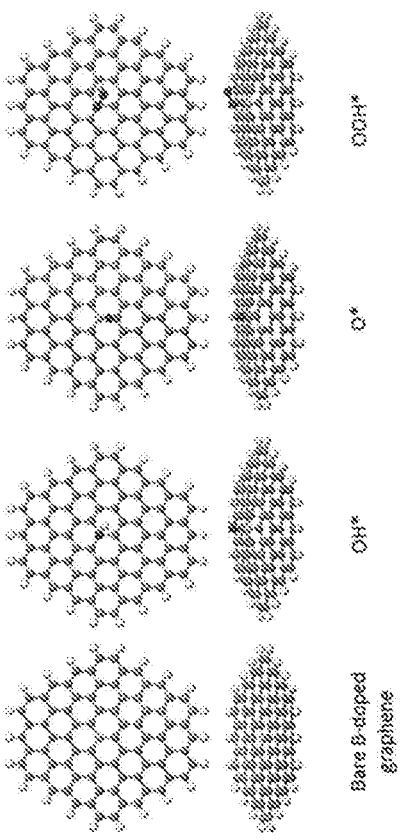

FIGS. 9(a), 9(b) and 9(c) show OER and ORR reaction intermediate structures with bare graphene, B-doped graphene and N-doped graphene as the working electrode.

Figures 10A, 10B:
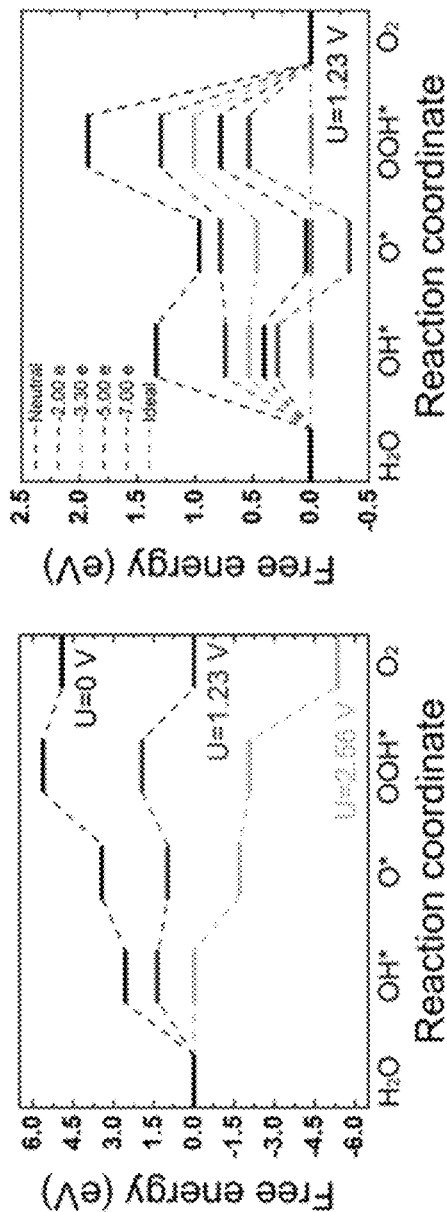
FIG. 10 shows computational results for OER with pristine graphene as working electrode, (a) no charge is applied to the working electrode and overpotential is 1.33V, and (b)

FIGS. 10(a) and 10(b) show computational results for OER with pristine graphene as working electrode. FIG. 10(a) shows free energies of various elementary reactions occurring at/near pristine graphene for three different primary voltages of 0V, 1.23V and 2.56V. In this case, no charge is applied to pristine graphene. In FIG. 10(b), free energies for different elementary reactions are shown for different charge values on graphene. The primary voltage is kept constant in this case i.e. $V_1$=1.23V. It is evident from these figures that when a negative charge is placed on the working electrode, a significant reduction in overpotential is predicted for the OER process.

In the electrocatalysis industry, $RuO_2$ and Pt are considered as highly efficient catalytic electrodes for OER and ORR processes respectively.

FIG. 11 shows that a pristine graphene electrode carrying an optimum charge can provide an OER activity comparable to $RuO_2$ material. The minimum overpotential predicted with pristine graphene electrode carrying a charge of –3.3 e is 0.54V. This shows that maintaining a suitable charge on an inexpensive electrode like graphene can provide a similar performance as of $RuO_2$ electrode for an OER process.

Figure 12B:
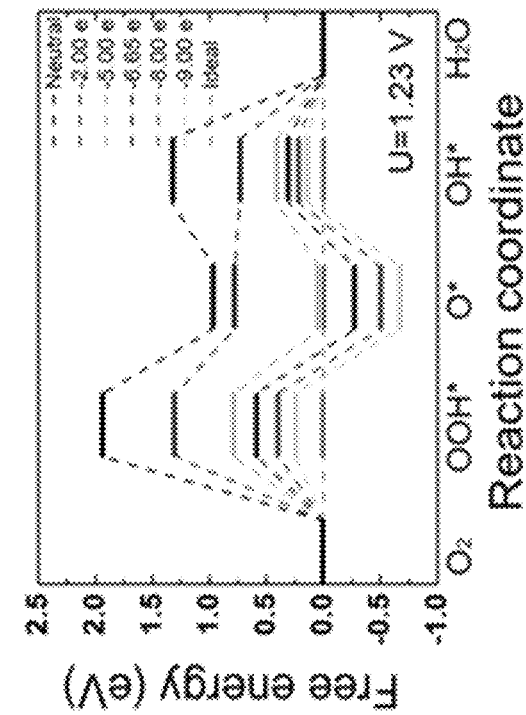
Figure 12A:
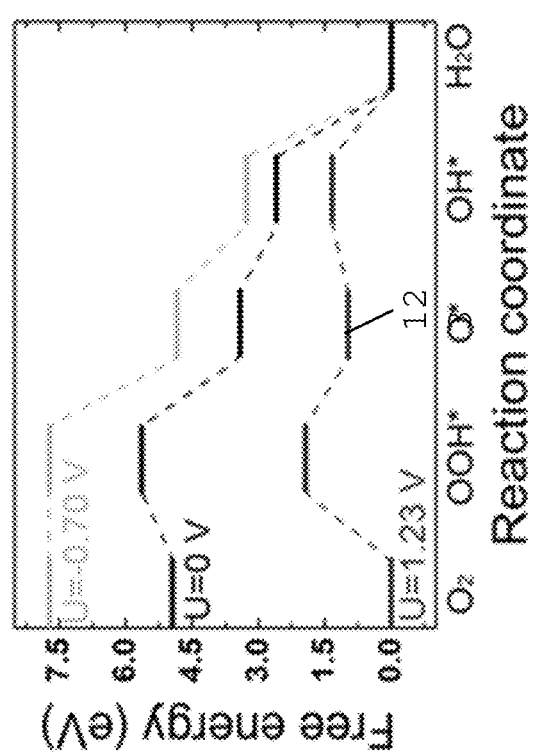

Referring now to FIG. 12(a), computational results are shown for ORR process with pristine graphene as the working electrode. Free energies of various elementary reactions are indicated for three different primary potentials of –0.7V, 0V and 1.23V. No charge is maintained on the graphene electrode in this case. In FIG. 12(b) free energies for different elementary reactions are shown for different charge values on graphene. In this case the primary voltage is kept constant at $V_1$=1.23V.

FIG. 13 shows that a pristine graphene electrode carrying an optimum charge can provide an ORR activity comparable to Pt electrode. The minimum overpotential predicted with pristine graphene electrode carrying a charge of –6.65 e is 0.58V.

FIG. 14 summarizes the computed minimum overpotentials (for optimal material charging in each case) for pristine graphene, B-doped graphene and N-doped graphene in comparison with the industry "gold standards" for OER ($RuO_2$) and ORR (Pt). Comparing the minimum computed overpotentials, it is evident that pristine graphene (as present in graphite or glassy carbon) is close to the performance of industry gold standard materials $RuO_2$ and Pt, and B- and N-doped graphene show even much better performance.

In another embodiment, the present invention can be used with the electrodes made of synthetic materials. With this approach, the efficiency of the chemical reaction can be highly enhanced through two separate effects; firstly by exploiting the properties of synthetic electrode material for enhanced electrolytic performance and secondly by using the lever of adjustable charge density on the synthetic electrode material.

FIGS. 15 and FIG. 16 show an enhancement in the performance of OER by maintaining a suitable charge on a readily available and inexpensive electrode material $SrTiO_3$. FIG. 15 shows high free energies for various elementary processes of OER when no charge is placed on the working electrode made of $SrTiO_3$. Therefore, $SrTiO_3$ is a poor material for OER if conventional electrocatalysis process is carried out without maintaining any charge on the $SrTiO_3$ electrode. However, when a charge density of 1 e is maintained on $SrTiO_3$, an overpotential of 0.68V is predicted which is 40% improvement from the "no charge" case.

Another example in which embodiments of the present invention can be applied is an electrocatalytic process of $CO_2$ reduction to form formic acid (HCOOH) and other short chain organics. In this reaction, using graphene or other carbon based materials as a catalytic electrode is usually very inefficient and typically has an overpotential of well over 1 eV. The computational calculations show that applying a charge modulation on N-doped graphene can greatly enhance the efficiency of this process. FIG. 17 shows a structure of N-doped graphene used in these computational calculations.

FIG. 18 shows intermediate structures of N-doped graphene for various elementary reduction steps for $CO_2$ reduction process.

FIG. 19 illustrates the variation in free energies of the elementary reactions involved in $CO_2$ reduction process for different extents of charge (−6 e,−8 e and −10 e) on N-doped graphene electrode. These free energy profiles are shown for small, moderate and higher negative charging. The predicted results in FIG. 19 indicate that for small charging (N=−6 e) of the N-doped graphene, weak absorption of large reaction barrier (0.83 eV) takes place. For intermediate charging (−8 e) of the N-doped graphene can result in electrocatalytic reduction of $CO_2$ to formic acid (HCOOH) with a small overpotential of only 0.64V. Whereas for large charging (−10 e) of the N-doped graphene results in strong absorption of intermediates and large desorption barrier (1.00 eV).

The above embodiments and examples describe electrochemical applications including HER, OER, ORR, $CO_2$ reduction. The invention is not limited to these applications. Embodiments may be applied for many applications across the field of electrochemistry.

In the above description, a number of configurations have been described which can be utilised to control the charge on a working electrode. These include capacitor arrangements and a gate electrode arrangement. The invention is not limited to these arrangements. Other arrangements which can be used to control charge on the electrode may be utilised in other embodiments.

In the above description of embodiments, electrodes have been shown schematically. It will be appreciated that the electrodes may be of any form, such as forms used in laboratories or on an industrial scale, and of any shape.

In the above description, the effect of modulating charge on the electrode on the binding energy of a half reaction of the electrode is considered. The invention is not limited to this effect. Management of the charge on a working electrode may be utilised in embodiments to affect many different criteria of an electrochemical process.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for reducing overpotential required for an electrochemical reaction at a working electrode, comprising:
   a primary circuit which includes a switch and a primary voltage source arranged to apply a primary voltage between a working electrode and a counter electrode of the primary circuit to implement an electrochemical reaction, wherein the primary circuit includes a first switch for electrical isolation of the working electrode from the counter electrode prior to implementation of the electrochemical reaction; and
   independent to the primary circuit, a control circuit including a second switch and a secondary voltage source, wherein the secondary voltage source is configured to apply a secondary voltage to the control circuit after the working electrode is electrically isolated from the counter electrode prior to implementation of the electrochemical reaction,
   wherein the control circuit is configured such that actuation of the second switch completes the control circuit and applies the secondary voltage to generate and asymmetrically store a net electrical charge on the electrically isolated working electrode, wherein the asymmetrically stored net electrical charge reduces an overpotential at the working electrode required for the electrochemical reaction.

2. An apparatus in accordance with claim 1, wherein the control circuit comprises a gate electrode positioned proximate the working electrode and arranged to generate the net electrical charge on the working electrode.

3. An apparatus in accordance with claim 2, wherein the control circuit is arranged to apply the secondary voltage to the gate electrode to produce a charge modulating electric field that shifts the working electrode's Fermi level upwards or downwards relative to earth potential, allowing electrons to flow into or out of the working electrode to produce a net negative or net positive charge on the working electrode.

4. An apparatus in accordance with claim 1, wherein the control circuit comprises a capacitor arrangement positioned proximate to the working electrode and arranged to generate the net electrical charge on the working electrode.

5. An apparatus in accordance with claim 4, wherein the capacitor arrangement is formed by a counter charged electrode and the working electrode which together form a pair of capacitive electrodes.

6. An apparatus in accordance with claim 4, wherein the capacitor arrangement comprises a pair of further electrodes forming a capacitor and positioned proximate the working electrode.

7. An apparatus according to claim 4, wherein the capacitor arrangement includes a counter charged electrode in the vicinity of the working electrode such that application of the secondary voltage to the capacitor arrangement produces an electric field that generates a net negative or net positive charge on the working electrode.

8. An apparatus according to claim 1, wherein the control circuit is arranged to apply the secondary voltage to an independent capacitor arrangement coupled to the working electrode to produce an electric field that facilitates charge separation on plates of the capacitor, thereby inducing localization of a net negative or net positive charge on the working electrode when earthed.

* * * * *